United States Patent

Heine

[11] 4,000,452
[45] Dec. 28, 1976

[54] MULTIPHASE VARIABLE-STEPPING-ANGLE SYNCHRONOUS MOTOR

[75] Inventor: Gunter Heine, Seelbach, Germany

[73] Assignee: Gerhard Berger Fabrik Elektrischer Messgerate, Lahr, Germany

[22] Filed: Aug. 23, 1974

[21] Appl. No.: 500,001

[30] Foreign Application Priority Data

Aug. 25, 1973 Germany .................. 2342994

[52] U.S. Cl. ...................................... 318/696
[51] Int. Cl.² ...................................... H02K 37/00
[58] Field of Search .......... 318/138, 254, 696, 685

[56] References Cited

UNITED STATES PATENTS

| | | | |
|---|---|---|---|
| 3,453,512 | 7/1969 | Polukowski | 318/254 |
| 3,510,699 | 5/1970 | Fredrickson | 318/138 |
| 3,546,547 | 12/1970 | Wallace | 318/138 |
| 3,609,500 | 9/1971 | Causer | 318/696 |
| 3,621,312 | 11/1971 | Palmero | 318/254 |
| 3,621,358 | 11/1971 | Hinrichs | 318/696 |
| 3,626,269 | 12/1971 | Stanley | 318/696 |

*Primary Examiner*—Gene Z. Rubinson
*Attorney, Agent, or Firm*—Toren, McGeady and Stanger

[57] ABSTRACT

In the motor disclosed, five stator windings are distributed on u groups each having five main poles and co-acts with a permanent magnet rotor. Each pole has $n+1$ pole teeth. The stator windings are connected in series or parallel to form five connecting points. A control switches five switches having an armature connected to a connecting point between a positive and negative potential so as simultaneously to energize the windings as required. The control then shifts the short-circuited condition to other windings in cyclical sequence while energizing the remaining four windings at any time. The pole divisions exhibit the relationships $$T_P = nT_S + \alpha, \quad \alpha = T_S(K+0.6)$$

$$T_P' = nT_S + \beta, \quad \beta = T_S(K'+0.6)$$

The ratio of the rotor tooth widths to stator tooth widths at the outer diameter of the rotor is equal or smaller than unity. The number of rotor teeth $Z_R = u(5n+4K+K'+3)$. In this relation $n$, $K$, and $K'$ are whole numbers and $T_P$, $T_P'$ and $T_S$ are pitches of adjacent main poles on adjacent groups and of adjacent pole teeth. The angles $\alpha$ and $\beta$ are pitches between adjacent teeth on adjacent poles and adjacent groups. The control means connect the windings so as to permit operation in one of five stepping angle modes and in a five phase or two phase mode.

23 Claims, 29 Drawing Figures

Fig. 1

STATOR WITH n=3, K=1, K'=3, u=2

| SWITCHING SEQUENCE AND RESULTING POLARITIES | | | | | | |
|---|---|---|---|---|---|---|
| STEP \ PHASE | $W_1$ | $W_2$ | $W_3$ | $W_4$ | $W_5$ | S |
| 0 | N | S | N | S | 0 | — |
| 1 | 0 | S | N | S | N | 1 |
| 2 | S | 0 | N | S | N | 2 |
| 3 | S | N | 0 | S | N | 3 |
| 4 | S | N | S | 0 | N | 4 |
| 5 | S | N | S | N | 0 | 5 |
| 6 | 0 | N | S | N | S | 1 |
| 7 | N | 0 | S | N | S | 2 |
| 8 | N | S | 0 | N | S | 3 |
| 9 | N | S | N | 0 | S | 4 |
| 10 | N | S | N | S | 0 | 5 |
| 11 = 1 | 0 | S | N | S | N | 1 |

SWITCHING SEQUENCE AND RESULTING POLARITIES

| WINDING STEP | MAIN POLE WINDINGS | | | | | | | | | | S |
|---|---|---|---|---|---|---|---|---|---|---|---|
| | I | VI | II | VII | III | VIII | IV | IX | V | X | |
| | W1.1 | W1.2 | W2.1 | W2.2 | W3.1 | W3.2 | W4.1 | W4.2 | W5.1 | W5.2 | |
| 0 | S | S | N | N | S | S | N | N | S | 0 | — |
| 1 | N | 0 | N | N | S | S | N | N | S | S | 1 |
| 2 | N | N | S | 0 | S | S | N | N | S | S | 2 |
| 3 | N | N | S | S | N | 0 | N | N | S | S | 3 |
| 4 | N | N | S | S | N | N | S | 0 | S | S | 4 |
| 5 | N | N | S | S | N | N | S | S | N | 0 | 5 |
| 6 | S | 0 | S | S | N | N | S | S | N | N | 1 |
| 7 | S | S | N | 0 | N | N | S | S | N | N | 2 |
| 8 | S | S | N | N | S | 0 | S | S | N | N | 3 |
| 9 | S | S | N | N | S | S | N | 0 | N | N | 4 |
| 10 = 0 | S | S | N | N | S | S | N | N | S | 0 | 5 |

STATOR: $n = 2$; $K = 1$; $u = 2$
ROTOR: $Z_R = 36$

| SWITCHING SEQUENCE AND RESULTING POLARITIES | | | | | | | | | | | |
|---|---|---|---|---|---|---|---|---|---|---|---|
| WINDING STEP | MAIN POLE WINDINGS | | | | | | | | | | S |
| | I | VI | II | VII | III | VIII | IV | IX | V | X | |
| 0 | N | N | S | S | N | N | S | S | N | N | |
| 1 | 0 | N | S | S | N | N | S | S | N | N | |
| 2 | 0 | 0 | S | S | N | N | S | S | N | N | |
| 3 | S | 0 | S | S | N | N | S | S | N | N | |
| 4 | S | S | S | S | N | N | S | S | N | N | |
| 5 | S | S | 0 | S | N | N | S | S | N | N | |
| 6 | S | S | 0 | 0 | N | N | S | S | N | N | |
| 7 | S | S | N | 0 | N | N | S | S | N | N | |
| 8 | S | S | N | N | 0 | N | S | S | N | N | |
| 9 | S | S | N | N | 0 | 0 | S | S | N | N | |
| 10 | S | S | N | N | 0 | 0 | S | S | N | N | |
| 11 | S | S | N | N | S | 0 | S | S | N | N | |
| 12 | S | S | N | N | S | S | S | S | N | N | |
| 13 | S | S | N | N | S | S | 0 | S | N | N | |
| 14 | S | S | N | N | S | S | 0 | 0 | N | N | |
| 15 | S | S | N | N | S | S | N | 0 | N | N | |
| 16 | S | S | N | N | S | S | N | N | N | N | |
| 17 | S | S | N | N | S | S | N | N | 0 | N | |
| 18 | S | S | N | N | S | S | N | N | 0 | 0 | |
| 19 | S | S | N | N | S | S | N | N | S | 0 | |
| 20 | S | S | N | N | S | S | N | N | S | S | |
| 21 | 0 | S | N | N | S | S | N | N | S | S | |
| 22 | 0 | 0 | N | N | S | S | N | N | S | S | |
| 23 | N | 0 | N | N | S | S | N | N | S | S | |

SWITCHING SEQUENCE AND RESULTING POLARITIES

| STEP\PHASE | $W_1$ | $W_2$ | $W_3$ | $W_4$ | $W_5$ | S |
|---|---|---|---|---|---|---|
| 0 | N | S | N | S | N | 6 |
| 1 | 0 | S | N | S | N | 7 |
| 2 | S | S | N | S | N | 8 |
| 3 | S | 0 | N | S | N | 9 |
| 4 | S | N | N | S | N | 10 |
| 5 | S | N | 0 | S | N | 11 |
| 6 | S | N | S | S | N | 12 |
| 7 | S | N | S | 0 | N | 13 |
| 8 | S | N | S | N | N | 14 |
| 9 | S | N | S | N | 0 | 15 |
| 10 | S | N | S | N | S | 6 |
| 11 | 0 | N | S | N | S | 7 |
| 12 | N | N | S | N | S | 8 |
| 13 | N | 0 | S | N | S | 9 |
| 14 | N | S | S | N | S | 10 |
| 15 | N | S | 0 | N | S | 11 |
| 16 | N | S | N | N | S | 12 |
| 17 | N | S | N | 0 | S | 13 |
| 18 | N | S | N | S | S | 14 |
| 19 | N | S | N | S | 0 | 15 |
| 20 | N | S | N | S | N | 6 |
| 21 | 0 | S | N | S | N | 7 |

MULTIPHASE VARIABLE-STEPPING-ANGLE SYNCHRONOUS MOTOR

REFERENCE TO RELATED COPENDING APPLICATIONS

This application is related to the copending application of the same applicant, Ser. No. 379,223, filed July 16, 1973, and now U.S. Pat. No. 3,866,104, and assigned to the same assignee as the present application. The subject matter of that application is hereby made a part of the present application as if fully recited herein.

BACKGROUND OF THE INVENTION

This invention relates to multiphase low speed synchronous motors of the homopolar type intended primarily for use as a stepping motor.

Homopolar motors are well known and are available for many manufacturers. Conventionally they take the form of two phase motors with eight stator poles, eight stator windings, and 5 × 8, or 40 stator pole teeth, and a permanent magnet rotor with $Z_R = 50$ rotor pole teeth. Such motors have a number of drawbacks, particularly instability at resonance points, and relatively low stepping frequencies.

An object of this invention is to improve synchronous motors.

Another object of this invention is to overcome the the many problems and achieve the requirements which stepping motors exhibit, with a minimum of stator laminations and motor attachments and to increase the stepping angle accuracy and reduce the production costs among a wide selection of models.

SUMMARY OF THE INVENTION

According to a feature of the invention, the stepping motor has a plurality of untapped stator windings which form a plurality of connecting points, a permanent magnet rotor, control means connected to the connecting points for energizing the windings, the stepping motor including u groups each having five main poles, each of said main poles having $n+1$ pole teeth, the stator windings being distributed on the groups and poles, the value n being an integral number equal to or greater than 0, the control means connecting the windings so as to permit operation in one of five stepping angle modes and in either a five phase or two phase relationship.

These and other features of the invention are more precisely pointed out in the claims. Other objects and advantages of the invention will become evident from the following detailed description when read in light of the accompanying drawings.

BRIEF DESCRIPTION OF THE DRAWINGS

FIG. 1' is a detail of the motor in FIG. 1.

DESCRIPTION OF PREFERRED EMBODIMENTS

Figure 1:
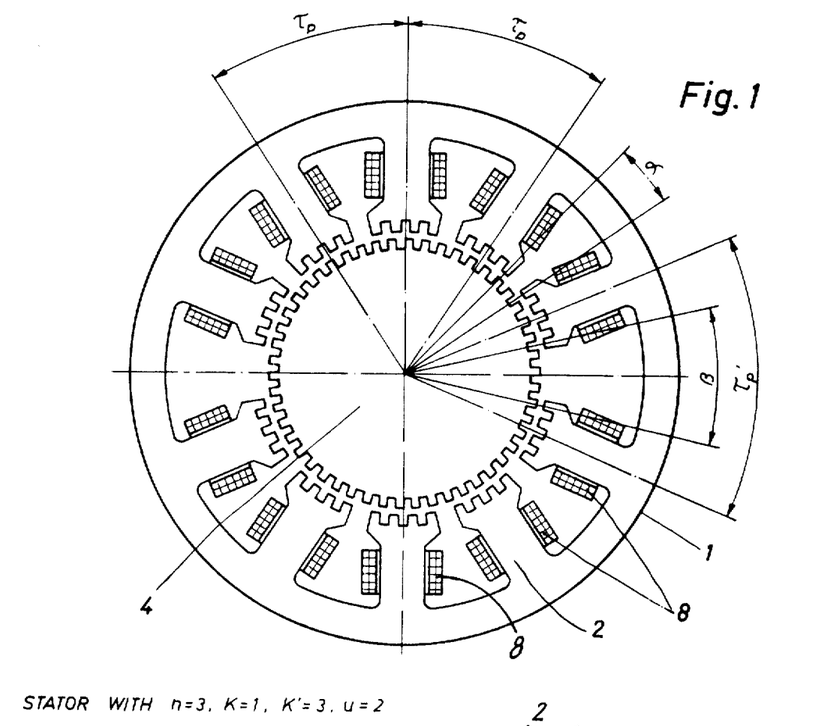
FIG. 1 is a partly schematic sectional view of a motor embodying features of the invention.

In FIGS. 1 and 1', a motor has five stator windings which are applied on 10, (5 × u groups) radially arranged stator main poles 2.

The stator body is composed of one or several laminated stator sheets or plates that form salient stator main poles 2 which are completely or partly wound. As more completely shown in FIG. 1' the poles 2 have $n+1$ stator pole teeth where n is a whole number equal to or greater than 0. The pole teeth form an operating air gap 3 between the stator 1 and a rotor 4.

Figure 2:
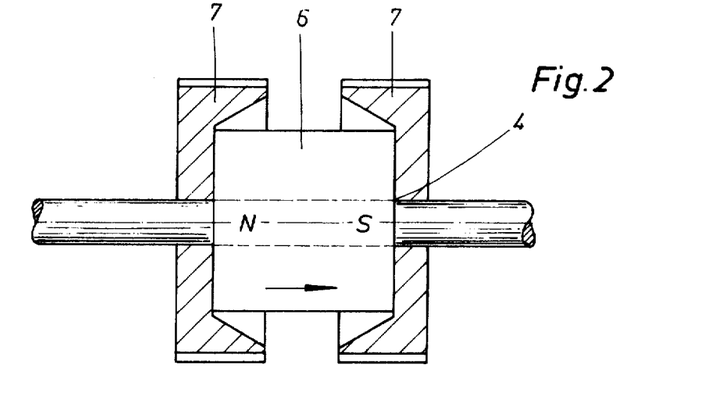
FIG. 2 is a partly schematic sectional view of the rotor in FIG. 1.

As shown in FIG. 2, the rotor is composed of an axially magnetized permanent central magnet with multipolar soft-magnetic pole caps 7 at both ends. As shown in FIG. 1', the teeth 4 of the two pole caps or pole shoes are tangentially offset relative to each other by one-half pole division.

The number of rotor teeth in FIGS. 1 and 1' $Z_R = u(5n + 4K + K' + 3)$, wherein n, K, and K' are whole numbers equal to or greater than 0. This corresponds to the structure in the aforementioned copending patent application.

Also in accordance with FIG. 1 of the aforementioned copending patent application, the interpolar gap angles between the stator main pole of the stator plate section in FIG. 1, with its 10 stator main poles, are $\alpha =$ $T_S$ ($K$+0.6). The interpolar gap angles between the two five-phase main polar groups $u$ are $\beta=T_S(K'+0.6)$.

Also, $T_P=nT_S+\alpha$, and $T_P' = nT_S+\beta$ where $T_P$ and $T_P'$ are the pitches between adjacent main poles within a group and the pitches between adjacent poles of different groups respectively and $T_S$ is the pitch between adjacent pole teeth.

Figure 5:
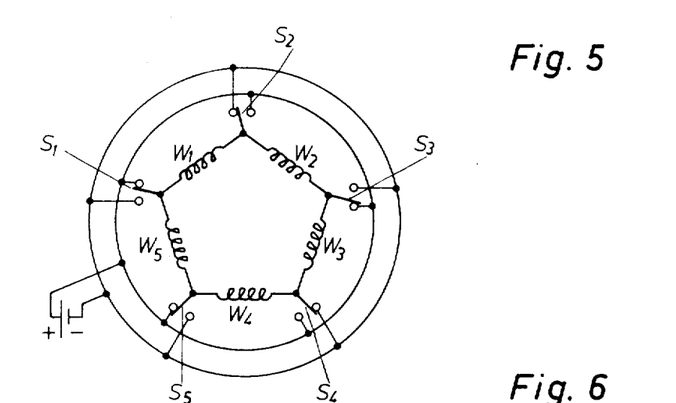
FIG. 5 is a schematic diagram of windings and control means therefor embodying features of the invention.
Figure 6:
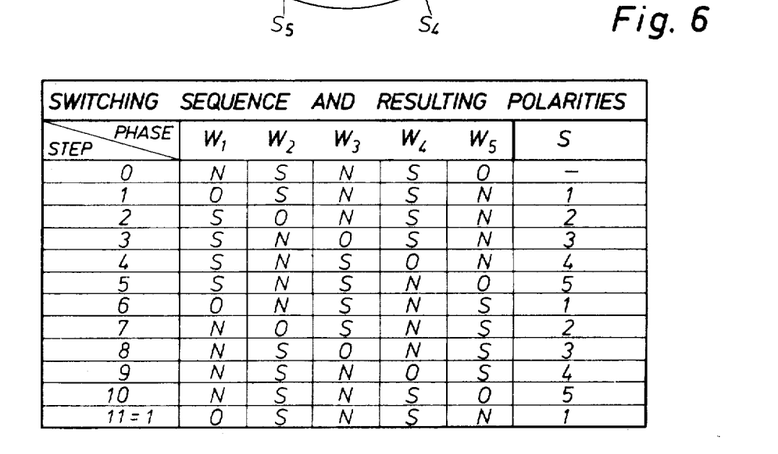
FIG. 6 is a chart illustrating the switching sequence and resulting polarities of the arrangement in FIG. 5.
Figure 7:
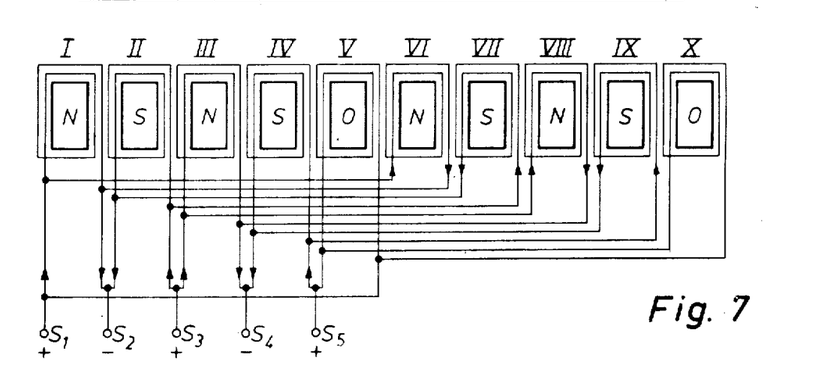
FIG. 7 is a winding diagram of the poles for a motor using the system in FIG. 5.

The windings and the starting arrangement of the five-phase motor according to the invention and as shown in FIG. 1 are normally connected as shown in FIG. 5. See the aforementioned copending application. In this circuit one main pole per pole group always remains unexcited. FIG. 6 illustrates the change of polarity of the 2 × 5 stator main poles of a five-phase pole group for a full cycle. FIG. 7 illustrates the winding connections of the five stator windings for $u=2$ pole groups. According to an embodiment of the invention, the two windings per phase can be connected in series instead of in parallel.

Figure 5A:
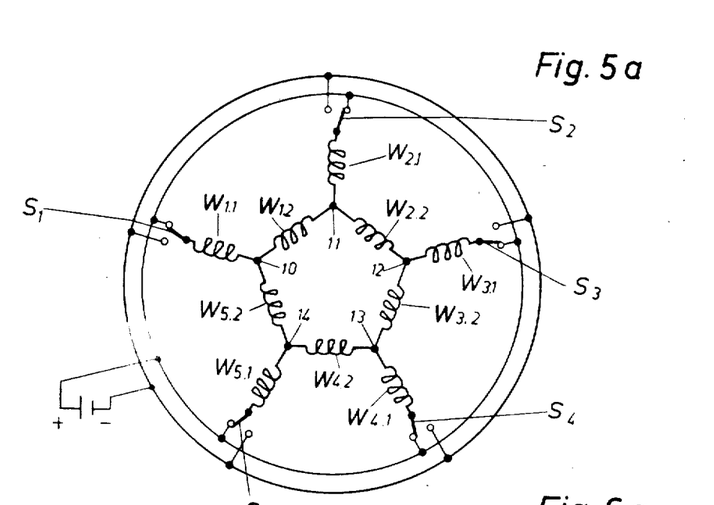
FIGS. 5a, 6a, and 7a are illustrations corresponding to those in FIGS. 5, 6, and 7 for another winding arrangement.
Figure 6A:
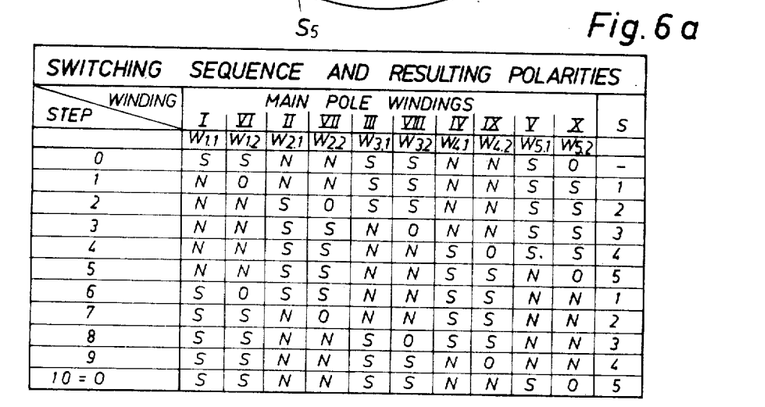

According to another embodiment of the invention the stator windings for $u=2, 4, 6$, etc. appears as shown in the circuit of FIG. 5a. The corresponding polarity changes appear in FIG. 6a, and the connection of the five stator windings appears in FIG. 7a.

With $u=2$ pole groups, the stator main pole windings $W_{1,2}$ to $W_{5,2}$ of the pole group VI to X are connected to a closed pentagon. However, switches $S_1$ to $S_5$ connect the windings $W_{1,1}$ to $W_{5,1}$ of the stator main poles I to V in a star connection from the nodal points 10 to 14.

The stepping and power behavior of this system corresponds to the pentagon circuit according to FIG. 5.

Figure 7A:
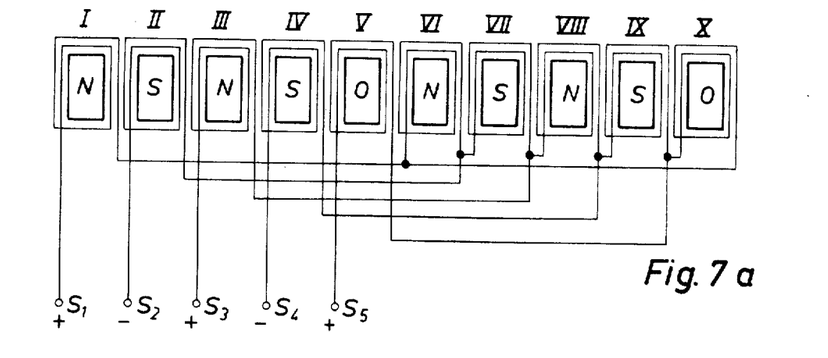

As mentioned, the connection of the ten main pole windings can be seen from FIG. 7a.

Exact measurements on motors which were built with stator plate sections according to FIG. 1 have shown that the individual step angles are not completely identical due to unsymmetrical stray fluxes ($\alpha \neq \beta$).

This is insignificant with a large number of steps, as determined by the operation, or with normal tolerances for each step angle. However, this may no longer be justifiable under certain circumstances when the individual step numbers are small and the tolerances very narrow.

Figure 3:
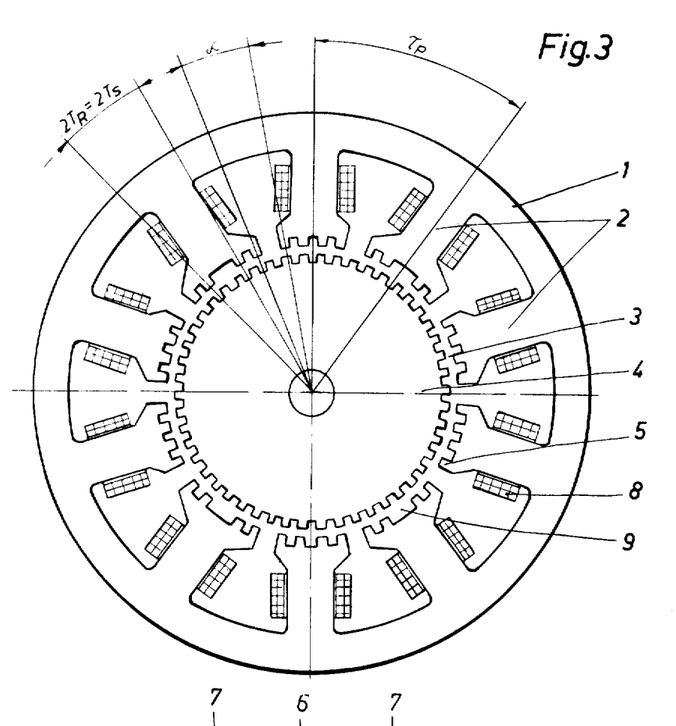
FIG. 3 is a partly schematic sectional view of another motor embodying features of the invention.
Figure 4:
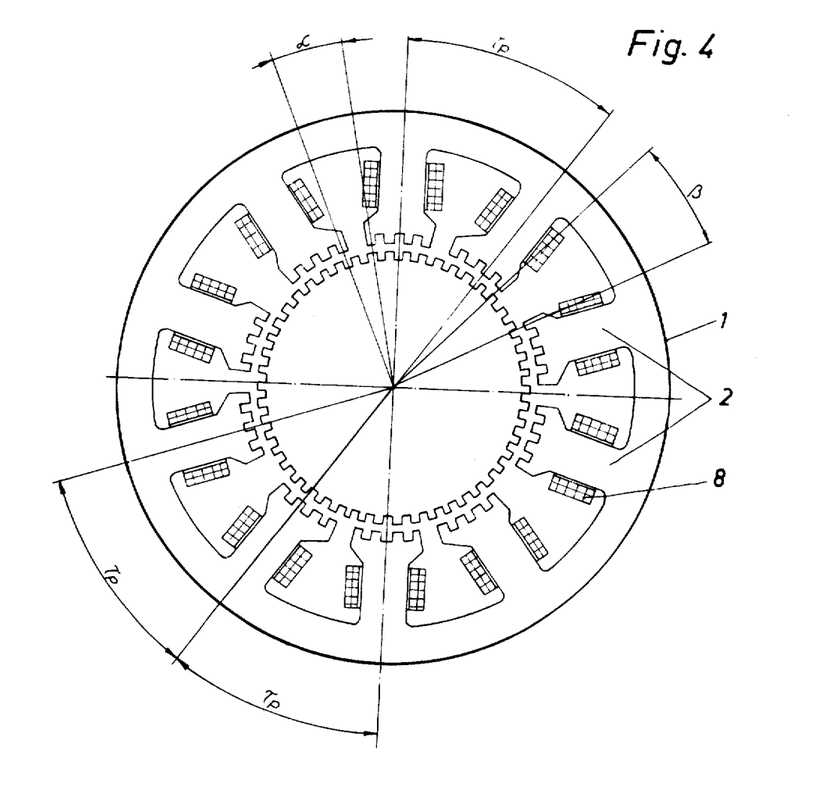
FIG. 4 is a partly schematic sectional view of another motor embodying features of the invention.

Considerations in this respect led to the stator plate sections shown in FIGS. 3 and 4, where symmetry was improved and a sufficiently high step angle accuracy insured. This is shown in the aforementioned U.S. patent application Ser. No. 379,223.

In the stator pole section of FIG. 3, the interpolar gap angles $\alpha$ are made equal to $\beta$. For this purpose the extraneous four stator pole teeth 9 in the center of four stator main poles are omitted. Thus, the magnetic stray condition between the main poles become symmetrical, and the step angle accuracy is advantageously increased. The interpolar gap teeth have virtually no effect upon the step angle accuracy. Thus here we have $Z_R = 5u(n+K+1) = 50$, with $u = 2$, $n = 3$, and $K = 1$.

In the stator pole section of the embodiment of FIG. 4, the stator pole teeth 9 are displaced laterally in one direction of rotation from the center of the stator pole teeth. Thus again, $\alpha$ is not equal to $\beta$. In this case, however, twice the number of smaller interpole gap angles $\beta$ are formed. Tests have shown that this produces accurate stepping angles. In this case we have $Z_R=u(5n+3K+2K'+3)=2(5\cdot3+3\cdot1+2\cdot2+3)=50$.

Naturally, the extraneous stator pole teeth 9 can also be omitted between the center and the end of the pole tooth group.

A complete symmetrical stator construction is obtained if the condition $Z_R=u(5n+3)$, with $u \geq 1$ and $n \geq 0$ is satisfied.

With all other rotor teeth numbers $Z_R$, an integral multiple of the rotor tooth pitch, which is not divisible by 5, cannot be distributed evenly over the main pole group.

Figure 8:
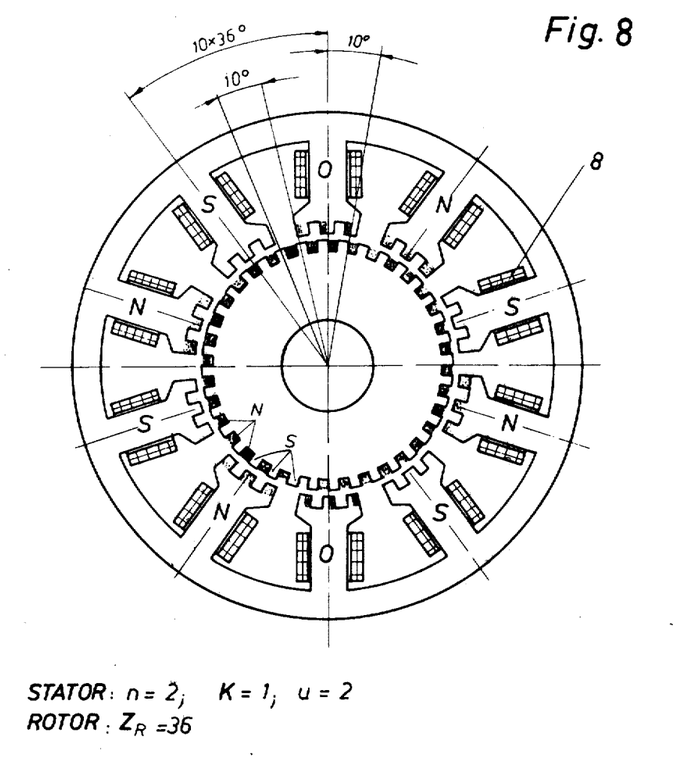
FIG. 8 is a partly schematic sectional view of another motor embodying features of the invention.

A completely symmetrical stator plate section for a five-phase motor is shown in FIG. 8. Here the number of rotor teeth is $Z_R=u(5n+4K+K'+3)=2(5\cdot2+4\cdot1+1+3)=36$ with $n=2; K=K'=1$.

The change of polarity of the 2 × 5 main poles as a function of the steps corresponds to that of the table in FIG. 6.

Thorough investigations have shown that the stator tooth pitch $T_S$ can be made somewhat greater than the rotor pole tooth pitch $T_R$, without any changes in the rotor step angle.

For the given example the stator tooth pitch in $T_S=T_R(n+K+o,6)/(n+K)=1.2T_R$.

A tooth pitch dimension according to the foregoing relation has a number of manufacturing advantages while changing the torque produced only slightly. However, attenuation is increased. Basically, according to the invention, the stator tooth pitch $T_S$ can be selected to be between 0.9 $T_R$ and 1.1 $[(n+K+0.6)/(n+K)]\times T_R$ for all sectional embodiments with a predetermined rotor tooth number $T_R$. As a prerequisite the centers of the tooth images of the main poles are spaced to correspond exactly to the equation $\tau_P=(n+K+O.0.6)T_R$.

Figure 9:
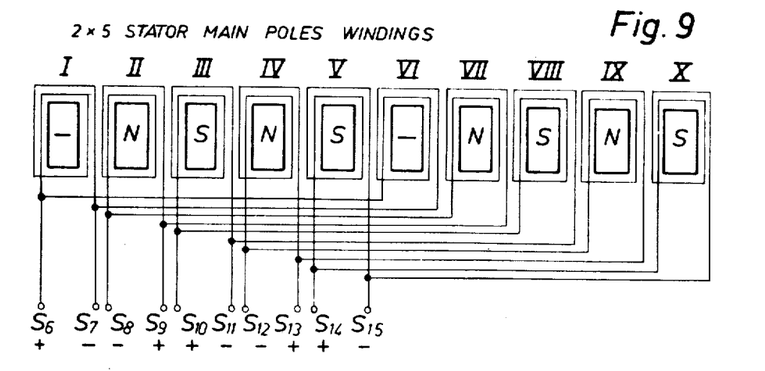
FIG. 9 is a winding diagram for motor poles embodying features of the invention.
Figure 10:
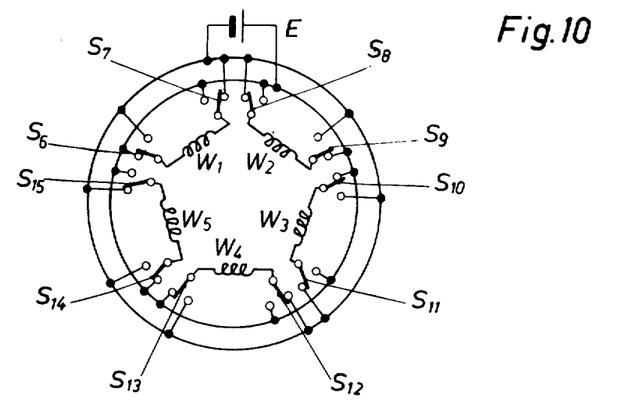
FIG. 10 is a connection diagram for windings in a motor embodying features of the invention.
Figure 11:
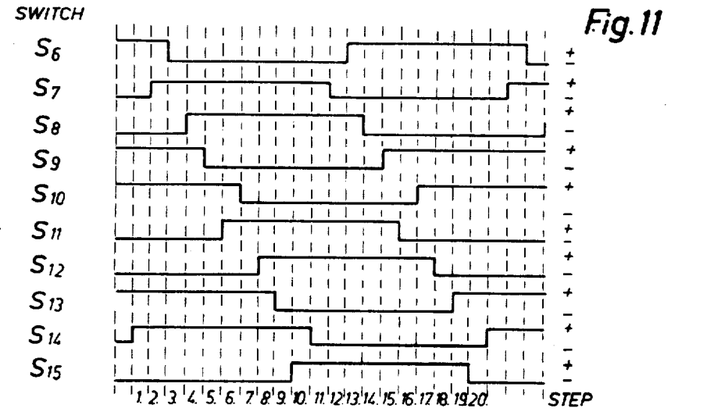
FIG. 11 is a voltage-step diagram illustrating the switch actuating sequence, and hence the voltages at corresponding nodes at the varying switches in FIG. 10 in the motor of FIG. 9.
Figure 12:
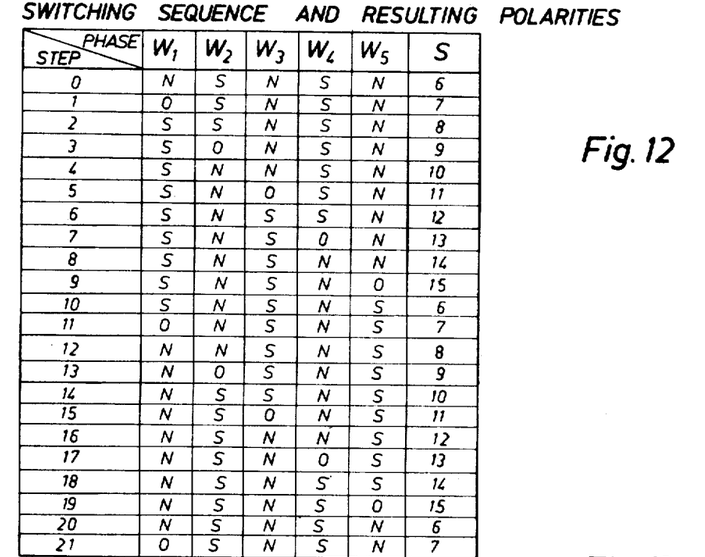
FIG. 12 is another polarity state table similar to FIG. 11 for setting forth another arrangement embodying features of the invention.
Figure 13:
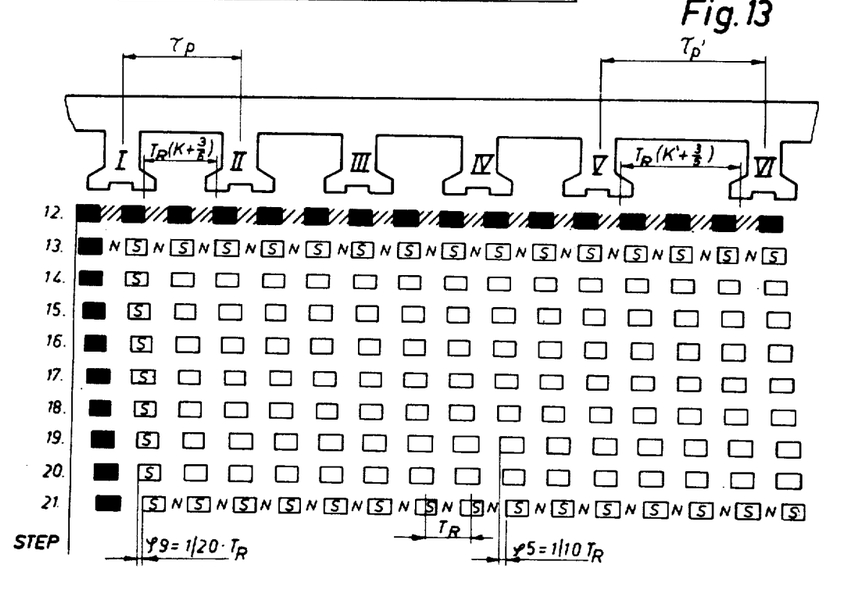
FIG. 13 illustrates schematically the movement of rotor poles relative to six stator poles of a 10 pole motor.

If the 10 main pole windings I to X are connected to FIG. 9, and the five stator pole windings W1 to W5 thus formed connected to the current source E in FIG. 10 through the 10 transfer switches $S_6$ $S_{15}$, and if the switches are actuated according to the switch position diagram in FIG. 11, the polarity state shown in the table of FIG. 12 for the 10 main poles at the control steps 1 to 21 is obtained. FIG. 13 represents the development of six poles of a schematized motor with 10 main poles. To this end, each respective rotor position is shown according to the polarity states from the 12th to the 21st step of FIG. 11. It can be seen that the motor moves from step to step by $(1/20)T_R$. Every second position is identical to a position of the previously described selection circuit of FIG. 5, where the rotor moves from step to step by $(1/10)T_R$.

With the two winding connections of FIGS. 5 and 9, it is possible to obtain $\phi_5=7.2°/10=0.72°$ and $\phi_9=7.2°120=0.36°$ from a motor whose construction is such that $Z_R=$ , $T_R=7.2°$ and $u=2$. The selection circuit of FIG. 5 allows us to obtain five hundred steps. The circuit of FIG. 9, however permits one thousand steps per revolution.

Figure 10A:
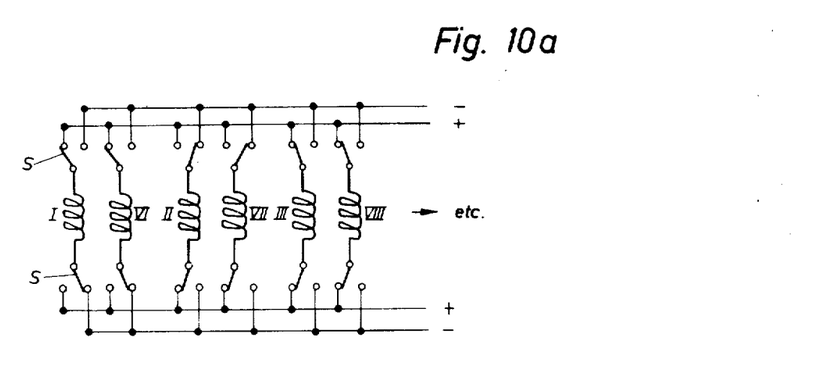
FIGS. 10a and 11a are two drawings corresponding to FIGS. 10 and 11 for another embodiment of the invention.

According to the invention, the number of steps per rotary revolution is varied utilizing the same mechanical motor construction. The condition for two thousand steps per rotor revolution can be satisfied, according to the invention by the circuit of FIG. 10a corresponding to the polarity state table in FIG. 11a. In the aforementioned two types of circuits, an entire phase winding W, composed for example of two main pole windings, is connected or disconnected. In the circuit of FIG. 10a, only one main pole winding W/2 of a phase winding W is, according to a feature of the invention, connected, disconnected, or switched per unit time. If the polarity state diagram of FIG. 12 is considered for example, which diagram is associated with the circuit of FIG. 9, it can be seen that in the transistion of step 0 to step 1 the phase winding $W_1$ jointly deenergizes the two poles I and VI. In this condition these two poles are not excited.

Figure 11A:
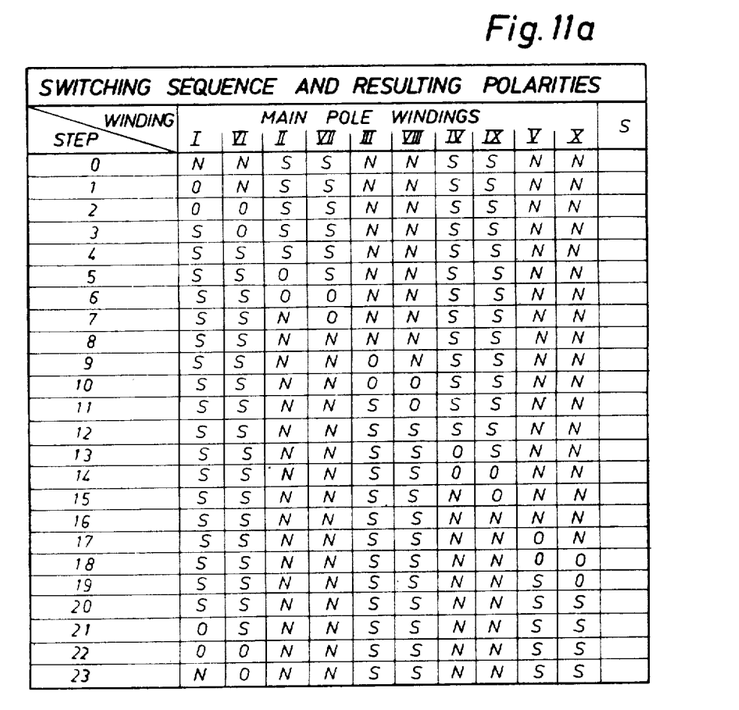

According to the polarity state table of FIG. 11a for the circuit of FIG. 10a, only the winding of pole I is disconnected in the first step, while the winding of pole VI remains connected. Only in the second step is the winding of pole 6 similarly disconnected (unexcited) according to the invention. This way, the stepping angle $\phi_9=1/20\times T_R$ corresponding to the circuit of FIG. 9, is, according to the invention, cut in half to $\phi_{13}=1/40\times T_R$. In the motor with the selection circuit of FIG. 10a, with $F_R$ equal to 50 rotor teeth, a stepping angle of $360°/50\times 40=0.18°$ and 2000 steps per rotor revolution is obtained.

Figures 14, 15, 16:
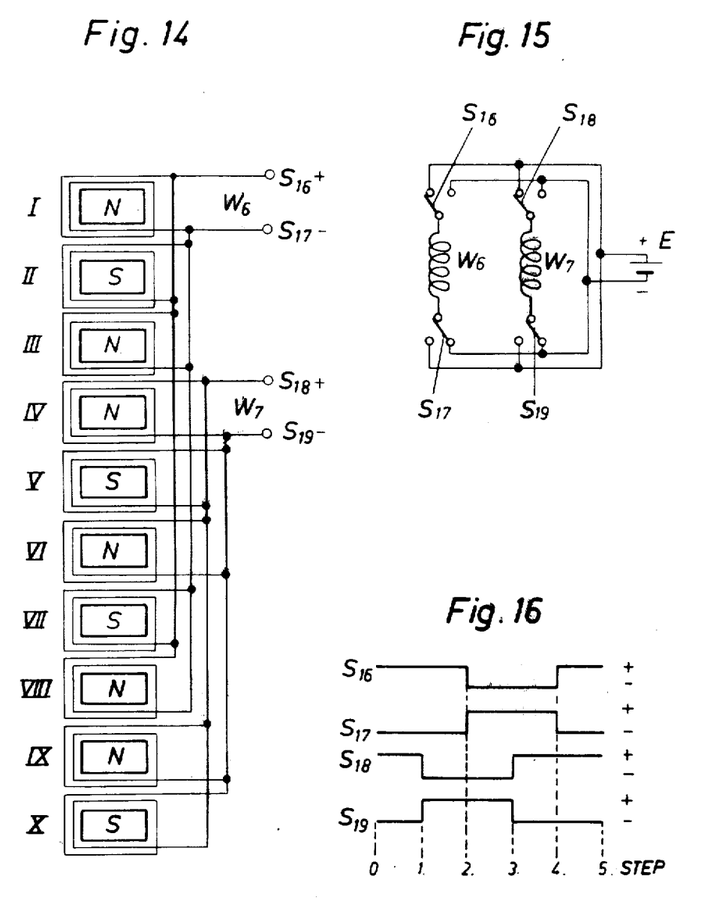
FIGS. 14, 15, and 16 illustrate the conditions for producing 200 and 400 steps per revolution, FIG. 14 illustrating the winding arrangement, FIG. 15 the switch arrangement, and FIG. 16 of the step for each switch operation.
Figure 17A:
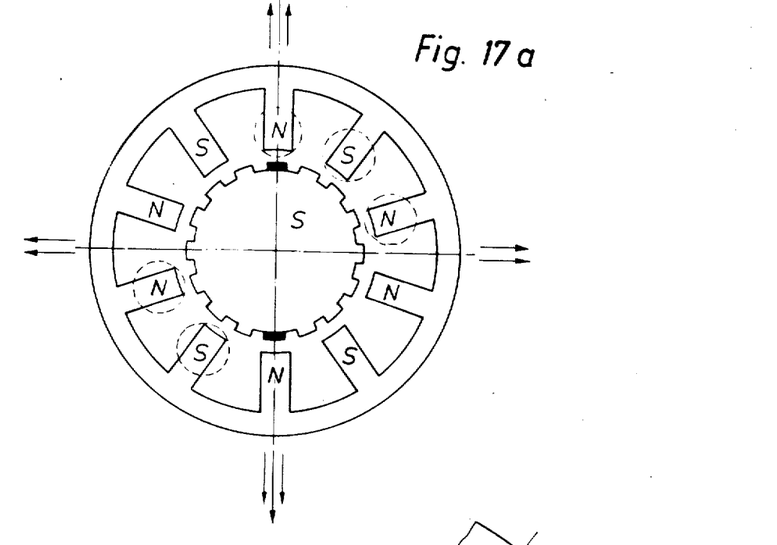
FIGS. 17a to 17d are schematic illustratons showing the rotary movement of a rotor as a result of the switching of current to the windings in a motor embodying features of the invention.
Figure 17B:
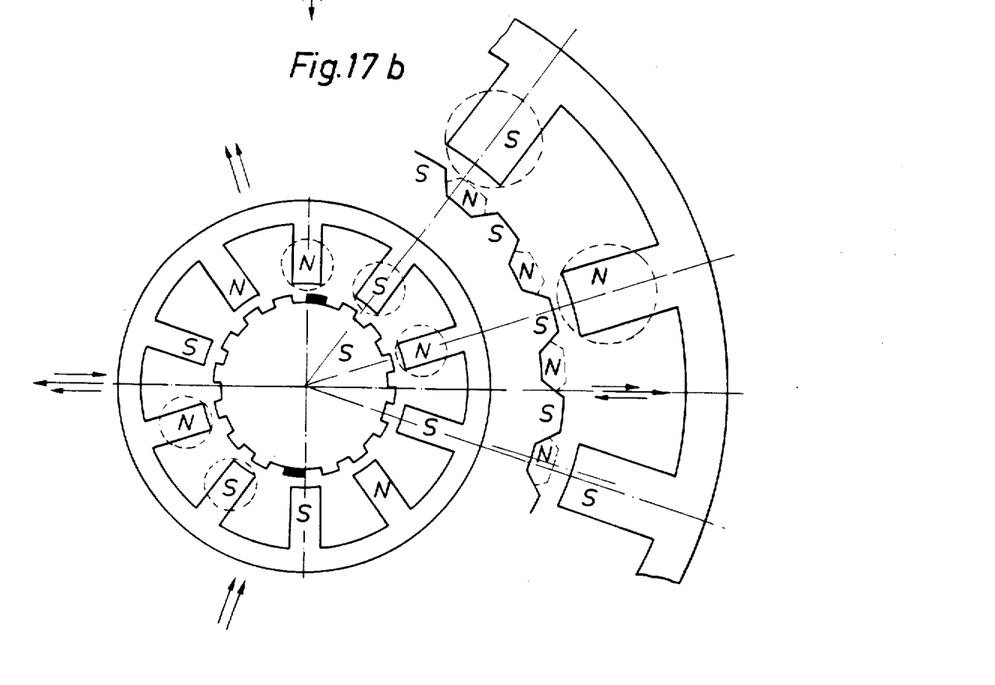
Figure 17C:
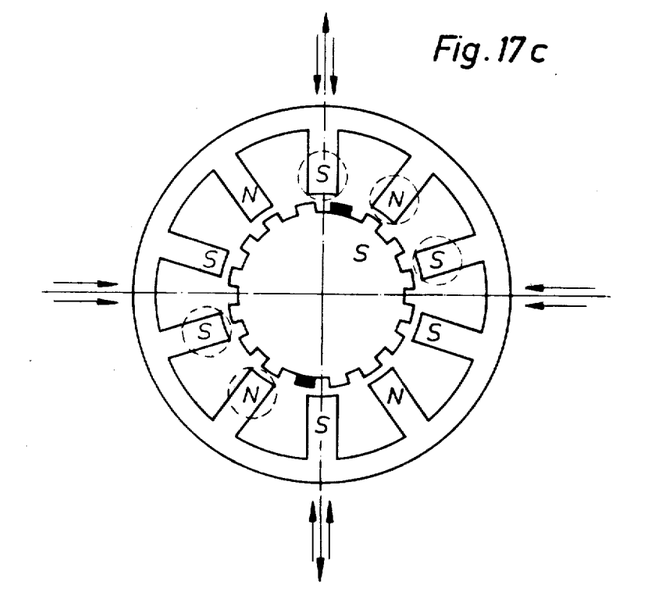
Figure 17D:
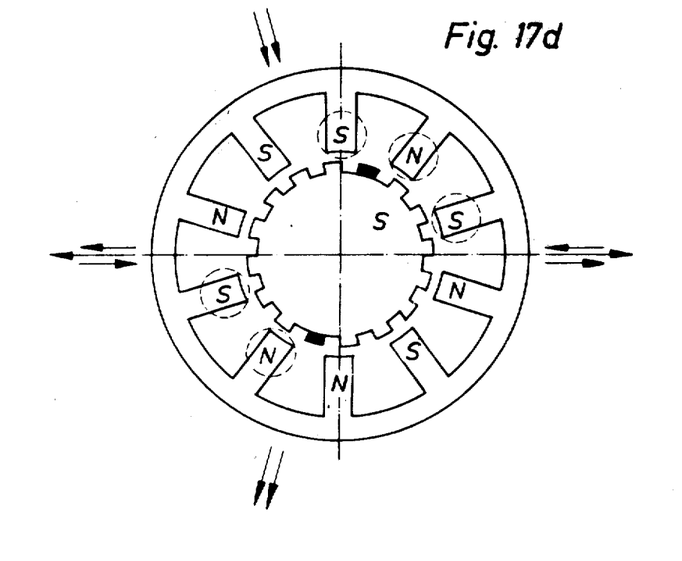

According to an embodiment of the invention the condition for 200 and 400 steps per rotor revolution is satisfied when the stator windings of pole I to X corresponding to the two-phase windings $W_6$ and $W_7$ are connected with each other as shown in FIG. 14 and excited with a current source through the switch arrangement of FIG. 15.

The winding $W_6$ is composed of the stator windings of poles I, II, III, VII and VIII. The latter are connected with each other and excited so that juxtaposed poles exhibit different polarities.

The winding $W_7$ is composed of the stator windings of poles IV, V, VI, IX, and X, and the latter are connected with each other in a manner corresponding to winding $W_6$.

Each winding is thus composed of two mutually overlapping groups of stator windings, with one group having three stator main poles and the other group having two stator main poles.

Actuating the switches $S_{16}$ to $S_{19}$ produces the particular polarity states illustrated in FIGS. 17a to 17d for the individual steps. That is to say, FIGS. 17a to 17d show the rotary movement of the rotor as a result of the switching of the windings in a motor embodying the invention where P=10, main poles n=0 and $Z_R=16$. In such a motor the rotor is moved by $T_R/4$. This is done by forming the magnetic attraction regions on the circumference of the working gap. The regions' centers change 90° from step to step as shown schematically in FIGS. 17a and 17b.

According to an embodiment of the invention, the number of North South poles changes step by step from 3u North and 2u South poles at one step to 2.5u North and 2.5u South poles at another, as well as to 2u North and 3u South poles at another. Thus only an even number of groups u=2 can be used for this division. According to another embodiment of the invention, a motor with $Z_R=50$ rotor teeth and $T_R=7.2°$ with the above described winding arrangement and selection circuit has a stepping angle of 1.8° corresponding to 200 steps per rotor revolution. According to another embodiment of this invention this angle is cut in half to $\phi=0.9°$, and 400 steps per revolution are obtained by alternately exciting two phases at one time during one step and only one of the phases the next step.

According to another embodiment of the invention, this motor is also operated, using the aforementioned winding arrangement, as a two-phase synchronous motor or a single phase synchronous motor with an auxiliary condensor phase. The synchronous speed is $60f/Z_R$ R.P.M.

Figure 18:
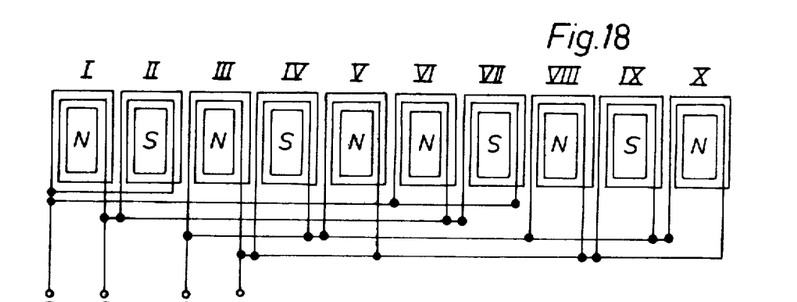
FIG. 18 is a schematic diagram illustrating the winding arrangement for another motor embodying features of the invention.
Figure 18A:
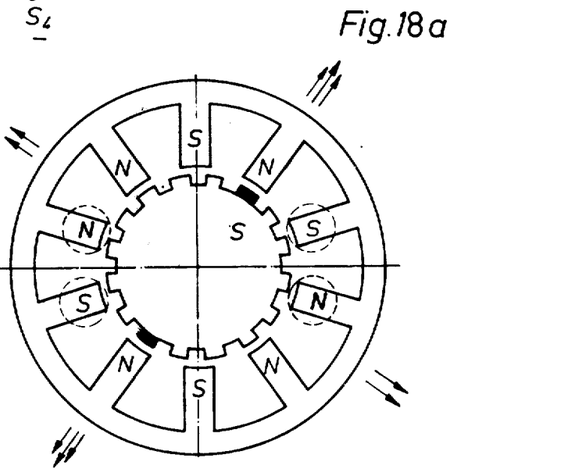
FIGS. 18a and 18b are motor schematic diagrams illustrating the use of motor layouts with odd group numbers.
Figure 18B:
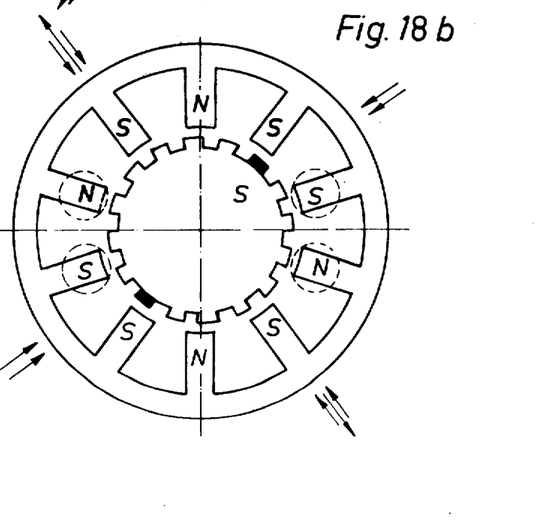

According to another embodiment of the invention a (3/2)u division is used. This makes it possible also to use motor layouts with an odd group number n=1. FIGS. 18a and 18b illustrate this principle. In the example of FIG. 18a, showing a motor with 10 main poles, the poles I, II, V, VI, VII and X form one phase, and the poles, III, IV, VIII and IX form the other phase. As shown in FIGS. 18a and 18b, two magnetic attraction regions are again formed with the number of north and south poles changing from step to step. However, at every fourth or sixth step, the individual polarity states are identical to the polarity state diagram in the five-phase operation outlined in FIG. 12. With the polarity sequence according to the switch positions of FIG. 16, step angles varying from step to step, namely in the sequence $(3/10)T_R$, $(2/10)T_R$, and $(3/10)T_R$, etc. prevail. The sum of two successive angles is always the same, namely $(½)T_R$.

According to another embodiment of the invention, the motor, when operating as a synchronous motor, has the same rotary speed as the motor described with respect to FIGS. 17a to 17d. If such a motor is to be driven as a stepping motor, external circuit means, such as high resistances or constant current regulators, cause the phase currents to have equal values.

With a parallel circuit, and when all 5u windings have equal winding data, the phase current divides itself over 3u poles in one phase and 2u poles in the other phase. In a motor whose working point is below the knee of the magnetization characteristic, the stepping angle of $(3/10)T_R$ is thus slightly reduced, and the following stepping angle of $(2/10)T_R$ is slightly increased. On the average, a stepping angle if $(¼)T_R$ prevails.

The present invention thus permits formation of stepping angles of 0.18, 0.36, 0.72, 0.9, and 1.8° with the same mechanical motor structure by changing the winding and switching arrangement. The invention permits operation of the motor with optimum performance in two-phase connection according to FIG. 15 as a two-phase synchronous or single phase condensor motor. This affords considerable economic and manufacturing advantages for these motors.

While specific embodiments of the invention have been shown and described in detail to illustrate the application of the inventive principles, it will be obvious to those skilled in the art that the invention may be embodied otherwise without departing from its spirit and scope.

What is claimed is:

1. A synchronous motor system, comprising a stepping motor having a plurality of untapped stator windings, said stator windings forming a plurality of connecting points, a permanent magnet rotor, control means connected to said connecting points for energizing said windings, said motor including u pole groups each having five main poles, one of said stator windings being wound on each of said poles, each of said main poles having n + 1 pole teeth, where n is a whole number equal to or greater than 0, said control means including one of a plurality of circuits connecting the windings for operation in one of five stepping angle modes and in a five phase or a two phase relationship.

2. A motor as in claim 1, wherein said control means connect the windings of several pole groups u belonging to the same phase in one of a series and parallel mode so as to operate the motor at one of two different operating voltages.

3. A motor as in claim 2, wherein the windings belonging to the same phase are connected in series.

4. A motor as in claim 2, wherein the windings belonging to the same phase are connected in parallel.

5. A motor as in claim 1, wherein current carrying means are connected to five $u$ main pole windings as shown in FIG. 5.

6. A motor as in claim 1, wherein current carrying means energize the windings and five $u$ main pole windings are connected as in FIG. 5a.

7. A motor as in claim 2, wherein said windings are connected by their respective connecting points in series with each other so as to form a complete ring and to form junctions where the connecting points are connected to each other, said control means including switching means connected to the junctions for energizing alternate ones of four of the windings oppositely at any one time and short circuiting a fifth winding and for sequentially shifting the energization and short circuit to others of the windings.

8. A motor as in claim 2, wherein a first plurality of the windings are connected at the connecting points to form a series ring having junctions, each of a second plurality of the windings being connected with one of its connecting points to one of the junctions, said control means having switching means connected to the other connecting point of the second plurality of windings for simultaneously applying alternate potentials between successive pairs of other connecting points on the second plurality of windings while short circuiting one pair of the other connecting points on the second plurality of windings and for sequentially switching the application of potentials and short circuit.

| Steps | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| W1 | N | N | O | S | S | S | S | S | S | S | S | S | O | N |
| W2 | S | S | S | S | O | N | N | N | N | N | N | N | N | N |
| W3 | N | N | N | N | N | N | O | S | S | S | S | S | S | S |
| W4 | S | S | S | S | S | S | S | S | O | N | N | N | N | N |
| W5 | O | N | N | N | N | N | N | N | N | N | O | S | S | S | and wherein 0 represents an unmagnetized winding and N and S represent respective north and south polarities.

10. A motor as in claim 2, wherein said control means include switching means for energizing five windings W1, W2, W3, W4, and W5 in sequential steps so as to magnetize the windings with the north N and south polarities in the order

| Steps | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| W1 | N | N | O | S | S | S | S | S | S | S | S | S | O | N |
| W2 | S | S | S | S | O | N | N | N | N | N | N | N | N | N |
| W3 | N | N | N | N | N | N | O | S | S | S | S | S | S | S |
| W4 | S | S | S | S | S | S | S | S | O | N | N | N | N | N |
| W5 | O | N | N | N | N | N | N | N | N | N | O | S | S | S | and wherein 0 represents an unmagnetized winding.

11. A motor as in claim 1, wherein said control means include switching means to energize 5 $u$ windings I, II, III, IV, V, VII, VIII, IX, and X in sequential steps with the north N and south S polarities in the order

| STEP | WINDING | | | | WINDINGS | | | | | |
|---|---|---|---|---|---|---|---|---|---|---|
| | I | VI | II | VII | III | VIII | IV | IX | V | X S |
| 0 | N | N | S | S | N | N | S | S | N | N |
| 1 | O | N | S | S | N | N | S | S | N | N |
| 2 | O | O | S | S | N | N | S | S | N | N |
| 3 | S | O | S | S | N | N | S | S | N | N |
| 4 | S | S | S | S | N | N | S | S | N | N |
| 5 | S | S | O | S | N | N | S | S | N | N |
| 6 | S | S | O | O | N | N | S | S | N | N |
| 7 | S | S | N | O | N | N | S | S | N | N |
| 8 | S | S | N | N | N | N | S | S | N | N |
| 9 | S | S | N | N | O | N | S | S | N | N |
| 10 | S | S | N | N | O | O | S | S | N | N |
| 11 | S | S | N | N | S | O | S | S | N | N |
| 12 | S | S | N | N | S | S | S | S | N | N |
| 13 | S | S | N | N | S | S | O | S | N | N |
| 14 | S | S | N | N | S | S | O | O | N | N |
| 15 | S | S | N | N | S | S | N | O | N | N |
| 16 | S | S | N | N | S | S | N | N | N | N |
| 17 | S | S | N | N | S | S | N | N | O | N |
| 18 | S | S | N | N | S | S | N | N | O | O |
| 19 | S | S | N | N | S | S | N | N | S | O |
| 20 | S | S | N | N | S | S | N | N | S | S |
| 21 | O | S | N | N | S | S | N | N | S | S |
| 22 | O | O | N | N | S | S | N | N | S | S |
| 23 | N | O | N | N | S | S | N | N | S | S |

9. A motor as in claim 1, wherein
said control means include switching means for energizing five windings W1, W2, W3, W4, and W5 in sequential steps so as to magnetize the windings in the order wherein O represents an unmagnetized winding.

12. A motor as in claim 2, wherein said control means include switching means to energize the 5 $u$ windings I, II, III, IV, V, VI VII, VIII, IX, and X in sequential steps

| STEP | WINDING | | | | WINDINGS | | | | | |
|---|---|---|---|---|---|---|---|---|---|---|
| | I | VI | II | VII | III | VIII | IV | IX | V | X S |
| 0 | N | N | S | S | N | N | S | S | N | N |
| 1 | O | N | S | S | N | N | S | S | N | N |
| 2 | O | O | S | S | N | N | S | S | N | N |
| 3 | S | O | S | S | N | N | S | S | N | N |
| 4 | S | S | S | S | N | N | S | S | N | N |
| 5 | S | S | O | S | N | N | S | S | N | N |

-continued

| STEP | WINDING I | VI | II | VII | WINDINGS III | VIII | IV | IX | V | X S |
|---|---|---|---|---|---|---|---|---|---|---|
| 6  | S | S | O | O | N | N | S | S | N | N |
| 7  | S | S | N | O | N | N | S | S | N | N |
| 8  | S | S | N | N | N | N | S | S | N | N |
| 9  | S | S | N | N | O | N | S | S | N | N |
| 10 | S | S | N | N | O | O | S | S | N | N |
| 11 | S | S | N | N | S | O | S | S | N | N |
| 12 | S | S | N | N | S | S | S | S | N | N |
| 13 | S | S | N | N | S | S | O | S | N | N |
| 14 | S | S | N | N | S | S | O | O | N | N |
| 15 | S | S | N | N | S | S | N | O | N | N |
| 16 | S | S | N | N | S | S | N | N | N | N |
| 17 | S | S | N | N | S | S | N | N | O | N |
| 18 | S | S | N | N | S | S | N | N | O | O |
| 19 | S | S | N | N | S | S | N | N | S | O |
| 20 | S | S | N | N | S | S | N | N | S | S |
| 21 | O | S | N | N | S | S | N | N | S | S |
| 22 | O | O | N | N | S | S | N | N | S | S |
| 23 | N | O | N | N | S | S | N | N | S | S | wherein N represents a north polarity, S a south polarity and O an unmagnetized winding.

13. A motor as in claim 1, wherein 5 u pole windings are connected so that of 10 sequential windings, I, II, III, IV, V, VI, VII, VIII, IX, and X winding I, II, III, VII, and VIII are connected in parallel to each other as a first set to form alternative polarities and windings IV, V, VI, IX, and X are connected parallel to each other as a second set to form alternate polarities and the sets are energized to apply positive or negative current flows as follows:

| Steps | 1 | 2 | 3 | 4 | 5 | 6 | 7 |
|---|---|---|---|---|---|---|---|
| first set | + | + | − | − | + | + | − |
| second set | + | − | − | + | + | − | − |

14. A motor as in claim 2, wherein 5 u main pole windings are connected so that of 10 sequential windings I, II, III, IV, V, VI, VII, VIII, IX, and X winding I, II, III, VII, and VIII are connected in parallel to each other as a first set to form alternate polarities and windings IV, V, VI, IX and X are connected parallel to each other as a second set to form alternate polarities and the sets are energized to apply positive or negative current flows as follows:

| Steps | 1 | 2 | 3 | 4 | 5 | 6 | 7 |
|---|---|---|---|---|---|---|---|
| first set | + | + | − | − | + | + | − |
| second set | + | − | − | + | + | − | − |

15. A motor as in claim 1, wherein a two phase circuit is connected to the windings and the number of groups is odd and five u main pole windings are connected so that of 10 windings I, II, III, IV, V, VI, VII, VIII, IX, and X, on sequential poles, windings I, II, V, VI, VII, and X are connected in parallel with each other to form alternate polarities as one set and windings III, IV, VIII, and IX form alternate polarities as a second set and the sets are energized as follows

| Steps | 1 | 2 | 3 | 4 | 5 | 6 |
|---|---|---|---|---|---|---|
| set 1 | + | + | − | − | + | + |
| set 2 | + | − | − | + | + | − |

16. A motor as in claim 2, wherein a two phase circuit is connected to the windings and the number of groups is odd and 5 u main pole windings are connected so that 10 windings I, II, III, IV, V, VI, VII, VIII, IX, and X on sequential poles, windings I, II, V, VI, VII and X are connected in parallel with each other to form alternate polarities as one set and windings III, IV, VIII and IX form alternate polarities as a second set and the sets are energized as follows:

| Steps | 1 | 2 | 3 | 4 | 5 | 6 |
|---|---|---|---|---|---|---|
| set 1 | + | + | − | − | + | + |
| set 2 | + | − | − | + | + | − |

17. A motor as in claim 1, wherein each main pole winding includes two bifilar windings and connecting lines.

18. A motor as in claim 11, wherein each main pole winding includes two bifilar windings and connecting lines.

19. A motor as in claim 13, wherein each main pole winding includes two bifilar windings and connecting lines.

20. A motor as in claim 1, wherein the stator pole pitch has a value $0.9T_R$ to $1.1\,[(n+K+0.6)/(n+K)]T_R$ and the condition for the distance between the center of a main pole tooth to the center of an adjoining main pole tooth satisfies $T_P=(n+K+0.6)T_R$ wherein $n$ and $K$ are integral numbers equal to or greater than 0.

21. A synchronous motor system, comprising a stepping motor having a plurality of untapped stator windings, said stator windings forming a plurality of connecting points, a permanent magnet rotor, control means connected to said connecting points for energizing said windings, said motor including $u$ pole groups each having five main poles, each of said main poles having $n + 1$ pole teeth, said stator windings being distributed on said groups and poles, said poles being divided in accordance with the relations $$T_P = nT_R + \alpha;\ \alpha = T_R(K+0.6)$$

$$T_P' = nT_R + \beta;\ \beta = T_R(K'+0.6)$$

the ratio of rotor tooth widths to stator tooth widths at the outer diameter of the rotor being equal to or smaller than unit, the number of rotor teeth $Z_R$ corresponding to the relationship $Z_R = u\,(5n + 4K + K' + 3)$, where $T_P$ is the pitch of adjacent main poles in a group, $T_S$ is the pitch of adjacent pole teeth, $\alpha$ is the angle between adjacent pole teeth on adjacent poles, $T_P'$ is the pitch between adjacent poles on adjacent groups, $\beta$ is the angle between adjacent pole teeth on adjacent groups, and $n$, $K$, and $K'$ are whole numbers equal to or greater than 0, said control means including one of a plurality of circuits for operation in one of five stepping angle modes and in a five phase or a two phase relationship.

22. A motor as in claim 21, wherein said control means includes means for alternately energizing adjacent windings in sequence and removing energy from one of the windings at all times.

23. A motor as in claim 21, wherein the number of pole groups is 2 and one group of windings is connected in a closed pentagon and a second group of windings connected from the nodal points of the pentagon in a star connection.

* * * * *